United States Patent
Lee et al.

(10) Patent No.: US 9,053,381 B2
(45) Date of Patent: Jun. 9, 2015

(54) INTERACTION SYSTEM AND MOTION DETECTION METHOD

(71) Applicant: WISTRON CORP., New Taipei (TW)

(72) Inventors: Chih-Hsuan Lee, New Taipei (TW);
Shou-Te Wei, New Taipei (TW);
Chia-Te Chou, New Taipei (TW)

(73) Assignee: Wistron Corp., New Taipei (TW)

( * ) Notice: Subject to any disclaimer, the term of this patent is extended or adjusted under 35 U.S.C. 154(b) by 101 days.

(21) Appl. No.: 13/750,908

(22) Filed: Jan. 25, 2013

(65) Prior Publication Data

US 2014/0086449 A1 Mar. 27, 2014

(30) Foreign Application Priority Data

Sep. 27, 2012 (TW) .............................. 101135487 A

(51) Int. Cl.
*G06K 9/00* (2006.01)
*G06K 9/32* (2006.01)

(52) U.S. Cl.
CPC .......... *G06K 9/3241* (2013.01); *G06K 9/00201* (2013.01); *G06K 9/00355* (2013.01)

(58) Field of Classification Search
None
See application file for complete search history.

(56) References Cited

U.S. PATENT DOCUMENTS

| | | | | |
|---|---|---|---|---|
| 4,843,568 A * | 6/1989 | Krueger et al. | ............... | 382/100 |
| 5,454,043 A * | 9/1995 | Freeman | ........................ | 382/168 |
| 5,495,576 A * | 2/1996 | Ritchey | ........................ | 345/420 |
| 5,594,469 A * | 1/1997 | Freeman et al. | ............... | 345/158 |
| 5,638,300 A * | 6/1997 | Johnson | ........................ | 702/153 |
| 7,042,440 B2 * | 5/2006 | Pryor et al. | ..................... | 345/158 |
| 7,598,942 B2 * | 10/2009 | Underkoffler et al. | ........ | 345/158 |
| 7,834,846 B1 * | 11/2010 | Bell | ............................. | 345/156 |
| 8,351,651 B2 * | 1/2013 | Lee | ............................... | 382/103 |
| 8,452,051 B1 * | 5/2013 | Lee | ............................... | 382/103 |
| 8,775,916 B2 * | 7/2014 | Pulsipher et al. | ............. | 714/819 |
| 2011/0262002 A1 * | 10/2011 | Lee | ............................... | 382/103 |
| 2012/0120060 A1 * | 5/2012 | Noda | ........................... | 345/419 |
| 2012/0159290 A1 * | 6/2012 | Pulsipher et al. | ............. | 714/819 |
| 2013/0120244 A1 * | 5/2013 | Lee | ............................... | 345/156 |
| 2013/0251204 A1 * | 9/2013 | Pulsipher et al. | ............. | 382/103 |

FOREIGN PATENT DOCUMENTS

TW 20019241 A1 5/2010

OTHER PUBLICATIONS

Taiwan Patent Office, Office Action, Patent Application Serial No. 101135487, Oct. 20, 2014, Taiwan.

* cited by examiner

*Primary Examiner* — Tsung-Yin Tsai

(57) ABSTRACT

A motion detection method applied in an interaction system is provided. The method has the following steps of: retrieving a plurality of images; recognizing a target object from the retrieved images; calculating a first integral value of a position offset value of the target object along a first direction from the retrieved images; determining whether the calculated first integral value is larger than a first predetermined threshold value; and determining the target object as moving when the calculated first integral value is larger than the first predetermined threshold value.

6 Claims, 5 Drawing Sheets

INTERACTION SYSTEM AND MOTION DETECTION METHOD

CROSS REFERENCE TO RELATED APPLICATIONS

This Application claims priority of Taiwan Patent Application No. 10/1,135,487, filed on Sep. 27, 2012, the entirety of which is incorporated by reference herein.

BACKGROUND OF THE INVENTION

1. Field of the Invention

The present invention relates to an interaction system, and in particular relates an interaction system and interaction method by using the relationship between the displacement of a hand of a user and time to reduce the probability for misjudging a gesture.

2. Description of the Related Art

A conventional interaction system may use gestures as input signals, and a processing unit in the conventional interaction system may execute default actions according to the input signals. The aforementioned gestures may usually indicate motions of a hand moving up, down, left, right, forward, or backward. It is easy for a person to distinguish the moving direction of his/her hand. However, for an interaction system, it may only know that hand motion signals have been received, and some other logic determination rules are required for the interaction system to recognize gestures.

As long as there is hand motion, a conventional interaction system may retrieve a moving direction from the hand motion signals and output the moving direction directly. In other words, the conventional interaction system may perform an interaction process in a corresponding direction as long as there is slight displacement of a target object capable of being detected by the interaction system. However, slight motion or movement of a hand may not indicate the input of hand motion signals for a user. For example, when a user waves his/her hand to the right, when the user stops moving the hand, a force in the contrary direction may be applied to the hand by the user and thus the hand may slightly move to the left. In other words, the hand motion moving to the left is not a desired gesture for the user. However, the conventional interaction system may still consider the hand motion moving to the left, and movement of the hand may be misjudged.

BRIEF SUMMARY OF THE INVENTION

A detailed description is given in the following embodiments with reference to the accompanying drawings.

In an exemplary embodiment, a motion detection method applied in an interaction system is provided. The method has the following steps of: retrieving a plurality of images; recognizing a target object from the retrieved images; calculating a first integral value of a position offset value of the target object along a first direction from the retrieved images; determining whether the calculated first integral value is larger than a first predetermined threshold value; and determining the target object as moving when the calculated first integral value is larger than the first predetermined threshold value.

In another exemplary embodiment, an interaction system is provided. The interaction system comprises: an image capturing unit configured to capture a plurality of images and stores the captured images into a frame buffer; and a processing unit configured to retrieve the images from the frame buffer and recognize a target object from the retrieved images; wherein the processing unit further calculates a first integral value of a position offset value of the target object along a first direction from the images, and determines whether the calculated first integral value is larger than a first predetermined threshold value, and the processing unit further determines the target object as moving when the calculated first integral value is larger than the first predetermined threshold value.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
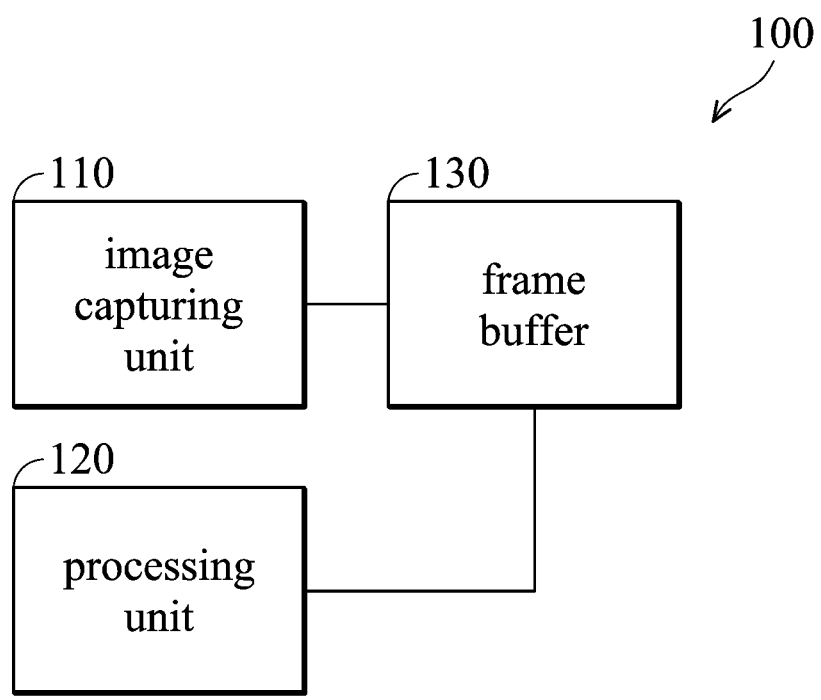
FIG. 1 is a schematic diagram of an interaction system 100 according to an embodiment of the invention.

FIG. 1 is a schematic diagram of an interaction system 100 according to an embodiment of the invention. In an embodiment, the interaction system 100 may comprise an image capturing unit 110, a processing unit 120 and a frame buffer 130. The image capturing unit 110 is configured to capture a plurality of images, and store the captured images into the frame buffer 130. The processing unit 120 is configured to retrieve the stored images from the frame buffer 130, and obtain at least one operation feature from the images, such as a hand of a user. In an embodiment, if the image capturing unit 110 is a digital camera configured to capture a plurality of two-dimensional images, the processing unit 120 may recognize the shape and the coordinate of a target object from the captured two-dimensional images by using an object recognition technique. For example, the target object may be a hand of a user or a specific object. When the image capturing unit 110 is composed of two neighboring digital cameras, the processing unit 120 may transform the captured two-dimensional images into three-dimensional images (e.g. two-dimensional images with depth images thereof) by using prior well-known techniques for transforming two-dimensional images into three-dimensional images. Since there is depth information in the three-dimensional images, the processing unit 120 may obtain the coordinate of the target object from the three-dimensional images.

In another embodiment, the image capturing unit 110 may be a depth camera configured to capture a plurality of three-dimensional images (e.g. two-dimensional image with depth images thereof). Since there is depth information in the three-dimensional images, the processing unit 120 may recognize a target object from the captured three-dimensional images by using an object recognition technique. For example, the target object may be a hand of a user or a specific object. The processing unit 120 may obtain the shape and the coordinate of the target object from the three-dimensional images directly. Specifically, it does not matter whether the three-dimensional images are directly captured by the image capturing unit 110 or transformed from two-dimensional images, the processing unit 120 may retrieve the target object by user preferences, such as retrieving an object with least depth as the target object.

Figure 2A:
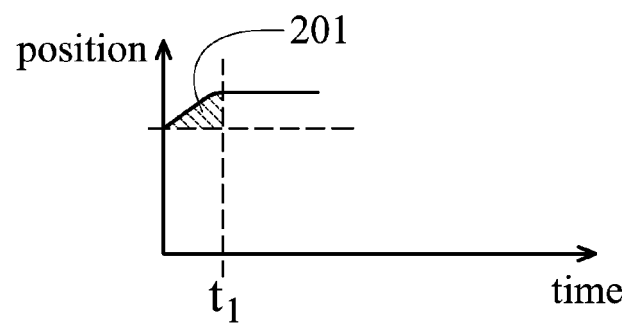
FIGS. 2A-2G are diagrams illustrating the relationship between the displacement of the target object and time according to an embodiment of the invention.

FIGS. 2A-2G are diagrams illustrating the relationship between the displacement of the target object and time according to an embodiment of the invention. After retrieving the target object, the processing unit 120 may further calculate the relationship between the displacement of the target object and time to determine whether the target object is moving or not. Specifically, the processing unit 120 may calculate an integral value by integrating the offset of the position (i.e. displacement) of the target object along a direction (e.g. X axis, Y axis or Z axis) over time. For example, the area of the region 201 in FIG. 2A is the integral value by integrating the displacement over time t1. If there is a respective candidate offset value in the dimension of the X axis, Y axis and Z axis (i.e. in the horizontal direction, vertical direction, and depth direction), the processing unit 120 may determine the largest offset value from the candidate offset values, determine a direction for a subsequent calculation and the position offset value thereof, and calculate an integral value of the determined direction. The processing unit 120 may further determine whether the calculated integral value is larger than a predetermined threshold value. If so, the processing unit 120 may determine the target object as moving. If not, the processing unit 120 may determine the target object as being stationary.

Figure 2B:
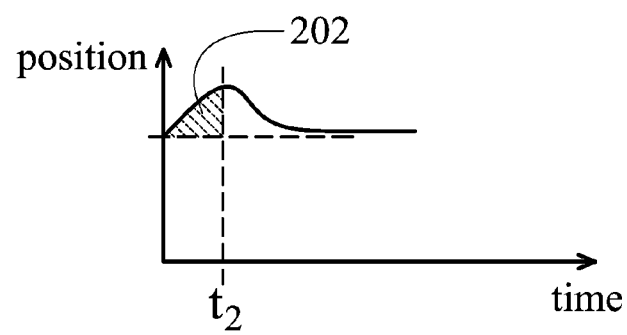

As illustrated in FIG. 2B, when the target object moves along a direction (e.g. X axis) and then moves toward a contrary direction, the processing unit 120 may determine whether the area of the region 202 is larger than a predetermined threshold value. If not, the processing unit 120 may recalculate the area of the region 203. If so, the processing unit 120 may determine the target object as moving.

Figure 2C:
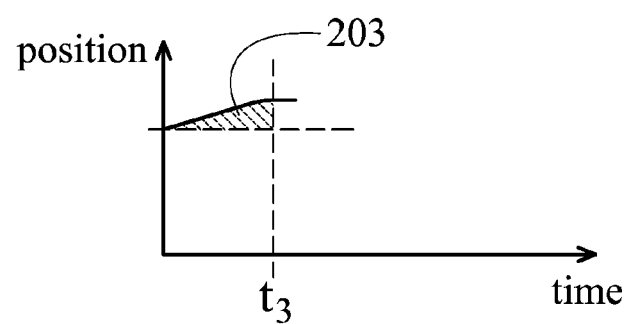
Figure 2D:
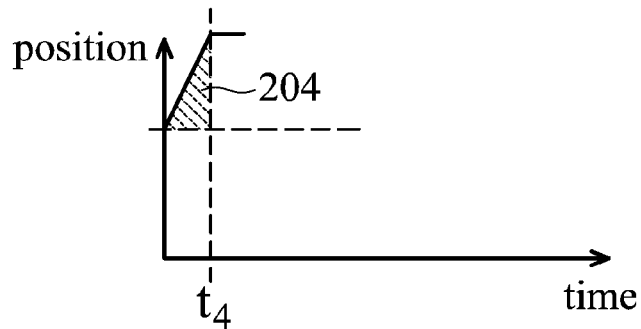

As illustrated in FIGS. 2C and 2D, the determination result of the processing unit 120 is not affected by the moving speed of the target object. For example, the target object in FIG. 2C has a slower moving speed, and the target object in FIG. 2D has a faster moving speed. The processing unit 120 may keep calculating the integral value of the position offset value of the target object over time (e.g. time t3 and t4). That is, the processing unit 120 may determine whether the target object is moving or not by using the areas of the regions 203 and 204.

Figure 2E:
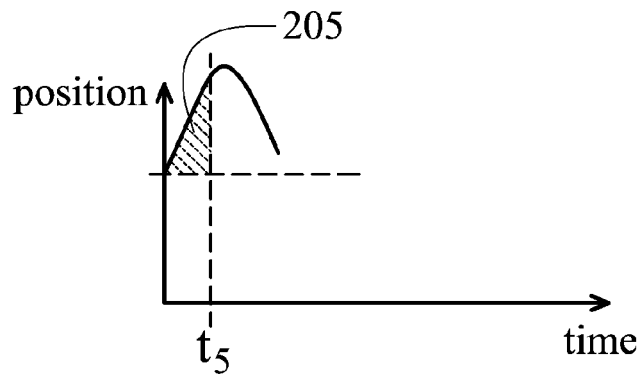

As illustrated in FIG. 2E, it is not necessary for the processing unit 120 to calculate the integral value of the position offset value over time after the target object has fully stopped. Specifically, the processing unit 120 may consistently keep calculating the integral value of the position offset value of the target object over time (e.g. time t5), such as the area of the region 205 in FIG. 2E. When the area of the region 205 is larger than a predetermined threshold value, the processing unit 120 may determine the target object as moving before the target object has fully stopped. It should be noted that the target object may be a hand, for example, and the gesture may usually indicate the hand motion moving up, down, left right, forward, or backward. That is, the gesture of the hand may be motions in the X axis, Y axis and Z axis. The processing unit 120 may calculate the integral value of the position offset value along the X axis, Y axis, and Z axis over time, respectively. It does not matter whether the motion of the target object is along the X axis, Y axis or Z axis, the processing unit 120 may use the technique in the aforementioned embodiments to calculate the integral values along different axes and determine whether the target object is moving or not.

As for the position offset values of the target object along the X axis and Y axis, the processing unit 120 may calculate the actual moving distance of the target object by using the focal length of the image capturing unit 110 and the moving distance (i.e. in pixels) of the target object in the images. As for the position offset value in the Z axis (i.e. depth direction), the depth of an object in the depth image can be expressed by different luminance values from 0 to 255. For example, the luminance value 0 may indicate that the object has the least depth, which is closest to the lens. The luminance value 255 may indicate that the object has the deepest depth, which is farthest to the lens. A contrary way can be used in the invention to express the depth of an object. For example, the luminance value 255 may indicate that the object has the least depth, which is closest to the lens. The luminance value 0 may indicate that the object has the deepest depth, which is farthest to the lens. After retrieving the luminance value indicating the corresponding depth of the target object in the depth image, the processing unit 120 may further transform the retrieved luminance value to the actual position of the Z axis. Specifically, the luminance values 0 to 255 in the depth image may merely indicate a specific range of depth, such as a distance of 0 m to 30 m or 0 m to 50 m between the target object and the lens. The corresponding depth value of the target object can be transformed into the actual position in the Z axis linearly or non-linearly. It should be noted that the aforementioned linear or non-linear transformation methods may not affect the determination result in the invention.

Figure 2F:
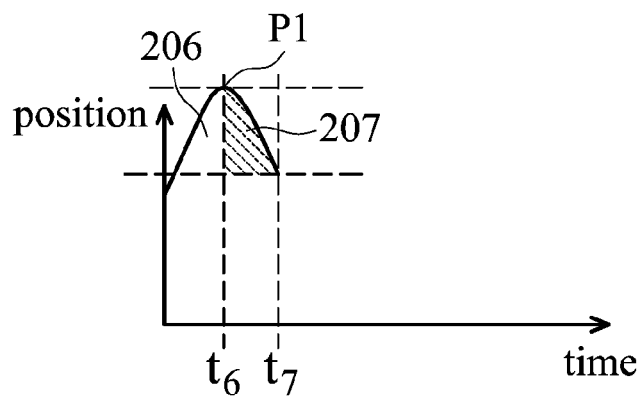

In another embodiment, the target object may not move along the same direction. For example, given that a hand of a user is determined as the target object, when the user waves the hand, the hand may move along an initial direction (e.g. X axis). When the user wants to stop waving the hand, the hand may move toward a contrary direction by a reaction force. In addition, the user may also wave the hand left and right. Meanwhile, the processing unit 120 should not only calculate the integral value of the target object in the initial moving direction, but also consider the reaction motion of the target object. As illustrated in FIG. 2F, the processing unit 120 may consistently keep calculating the integral value of the position offset value of the target object along a first direction over time (e.g. calculating the area of the region 206 before the position p1). When the area of the region 206 is not larger than a predetermined threshold value and the processing unit 120 determines that the target object has moved toward a second direction contrary to the first direction from the images, the processing unit 120 may recalculate the integral value of the position offset value of the target object along the second direction over time. For example, the area of the region 207 between time t6 and t7 is calculated, wherein time t7 can be regarded as current time.

Figure 2G:
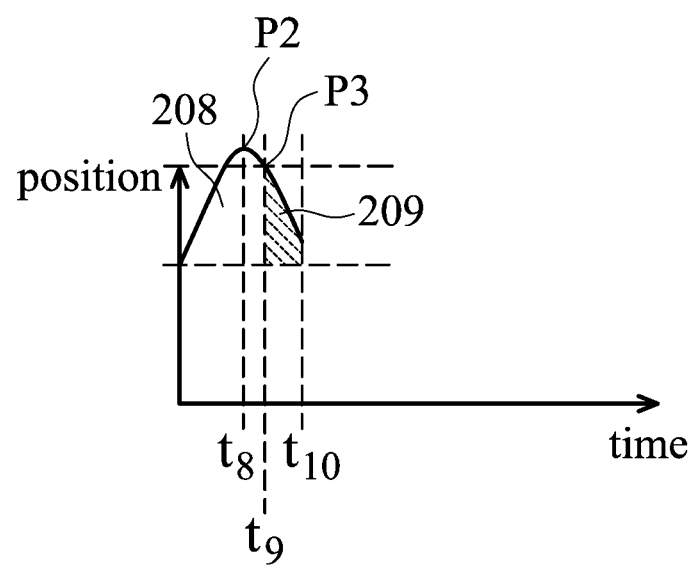

In yet another embodiment, as illustrated in FIG. 2G, the processing unit 120 may consistently keep calculating the integral values of the position offset value of the target object along the same direction over time (i.e. calculating the area of the region 208 before the position p2). When the area of the region 208 is not larger than a predetermined threshold value and the processing unit 120 has determined that the target object is moving toward a second direction contrary to the first direction, the processing unit 120 may recalculate the integral value of the position offset value of the target object along the second direction over time. The difference between FIGS. 2F and 2G is that the processing unit 120 may not calculate the integral value of the position offset value of the target object along the second direction immediately when the target object is moving toward a contrary direction (i.e. the second direction) at time t8 in FIG. 2G. The processing unit 120 may wait for a while and then calculate the integral of the position offset value of the target object over time t9 to t10. That is, the area of the region 209 is calculated. It should be noted that the movement after the target object has stopped may not be regarded as the motion in the contrary direction in the aforementioned embodiment.

Figure 3:
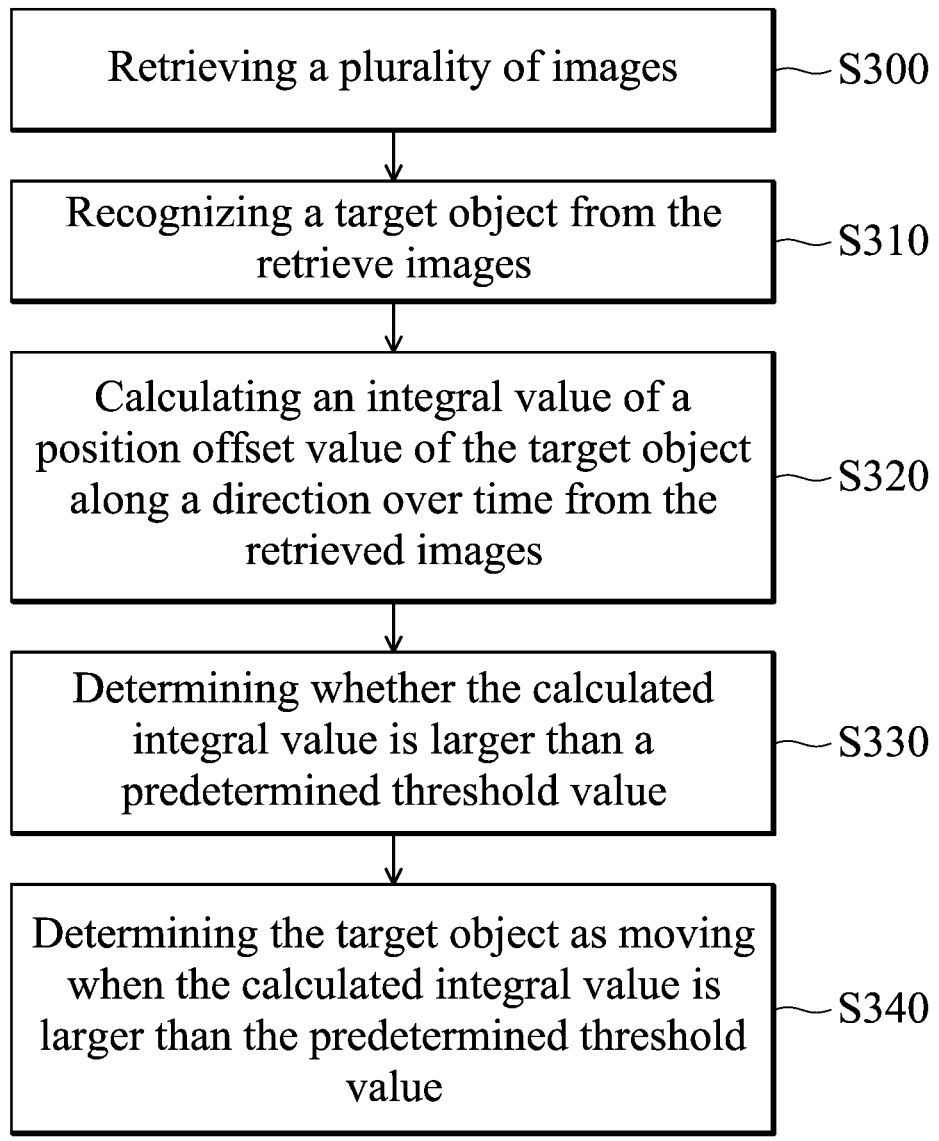
FIG. 3 is a flow chart illustrating a motion detection method applied in the interaction system 100 according to an embodiment of the invention.

FIG. 3 is a flow chart illustrating a motion detection method applied in the interaction system 100 according to an embodiment of the invention. In step S300, the image capturing unit 110 of the interaction system 100 may capture a plurality of images and stores the captured images into the frame buffer 130. The processing unit 120 may retrieve the captured images from the frame buffer 130. In step S310, the processing unit 120 may recognize a target object from the retrieve images. In step S320, the processing unit may calculate an integral value of a position offset value of the target object along a first direction over time from the images. In step S330, the processing unit 120 may determine whether the calculated integral value is larger than a predetermined threshold value. In step S340, when the calculated integral value is larger than the predetermined threshold value, the processing unit 120 may determine the target object as moving.

In view of the above, the integral value of the position offset value of the target object over time is used to determine whether the target object is moving or not in the invention. A target object with a slower moving speed or a shorter moving distance may not affect the determination result. For example, when a female and a male waves their right hand to the right, the moving distance of the female's hand may be shorter compared with that of the male's hand. However, it may not indicate that the female cannot operate the interaction system 100 with a slight hand motion. The integral value of the position offset value of the target object over time is used to determine whether the target object is moving or not in the invention. Although the position offset value of the target object may be small, the integral value of the position offset value may be larger than the predetermined threshold value after a certain period of time. Thus, the interaction system 100 may determine the interaction of the user. In addition, the movement (i.e. trembles) after the target object has stopped may not be misjudged in the invention.

The methods, or certain aspects or portions thereof, may take the form of a program code embodied in tangible media, such as floppy diskettes, CD-ROMs, hard drives, or any other machine-readable (e.g., computer-readable) storage medium, or computer program products without limitation in external shape or form thereof, wherein, when the program code is loaded into and executed by a machine such as a computer, the machine thereby becomes an apparatus for practicing the methods. The methods may also be embodied in the form of a program code transmitted over some transmission medium, such as an electrical wire or a cable, or through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A motion detection method applied in an interaction system having a processor and an image capturing unit, comprising:
   capturing a plurality of images by the image capturing unit;
   recognizing, by the processor, a target object from the captured images;
   repeatedly calculating, by the processor, a first integral value by integrating a first position offset value of the target object along a first direction over time from the captured images;
   determining, by the processor, whether the calculated first integral value is larger than a first predetermined threshold value;
   determining, by the processor, the target object as moving when the calculated first integral value is larger than the first predetermined threshold value;
   determining, by the processor, whether the target object is moving toward a second direction contrary to the first direction when the calculated first integral value is not larger than the first predetermined threshold value;
   calculating, by the processor, a second integral value of a second position offset value of the target object along the second direction from the captured images when the target object is moving toward the second direction after a predetermined time period;
   determining, by the processor, whether the calculated second integral value is larger than a second predetermined threshold value; and
   determining, by the processor, the target object as moving when the calculated second integral value is larger than the second predetermined threshold value.

2. The motion detection method as claimed in claim 1, further comprising:
   generating, by the processor, a plurality of corresponding depth images from the captured images;
   determining, by the processor, a corresponding depth value of the target object according to the corresponding depth images; and
   transforming, by the processor, the corresponding depth value to a position of the target object in a depth direction.

3. The motion detection method as claimed in claim 2, wherein the step of calculating the integral value further comprises:
   calculating, by the processor, a respective candidate position offset value of the target object in a horizontal direction, a vertical direction and the depth direction from the captured images;
   calculating, by the processor, a largest position offset value from the respective candidate position offset value corresponding to the horizontal direction, the vertical direction and the depth direction; and
   determining, by the processor, the first direction and the first position offset value according to the largest position offset value.

4. An interaction system, comprising:
   an image capturing unit configured to capture a plurality of images and stores the captured images into a frame buffer; and
   a processing unit configured to retrieve the images from the frame buffer and recognize a target object from the retrieved images;
   wherein the processing unit further repeatedly calculates a first integral value by integrating a first position offset value of the target object along a first direction over time from the images, and determines whether the calculated first integral value is larger than a first predetermined threshold value, wherein the processing unit further determines the target object as moving when the calculated first integral value is larger than the first predetermined threshold value, wherein the processing unit further determines whether the target object is moving toward a second direction contrary to the first direction when the calculated first integral value is not larger than the first predetermined threshold value, wherein the processing unit further calculates a second integral value of a second position offset value of the target object along the second direction from the retrieved images when the target object is moving toward the second direction after a predetermined time period, wherein the processing unit further determines whether the calculated second integral value is larger than a second predetermined threshold value, and wherein the processing unit further determines the target object as moving when the calculated second integral value is larger than the second predetermined threshold value.

5. The interaction system as claimed in claim 4, wherein the processing unit further generates a plurality of corresponding depth images from the retrieved images, determines a corresponding depth value of the target object according to the generated corresponding depth images, and transforms the corresponding depth value into a position of the target object in a depth direction.

6. The interaction system as claimed in claim 5, wherein the processing unit further calculates a respective candidate position offset value of the target object in a horizontal direction, a vertical direction and the depth direction from the retrieved images, calculates a largest position offset value from the respective candidate position offset value corresponding to the horizontal direction, the vertical direction and the depth direction, wherein the processing unit further determines the first direction and the first position offset value according to the largest position offset value.

* * * * *